United States Patent [19]
Waldin

[11] 3,733,839
[45] May 22, 1973

[54] PROCESS FOR REMOVING ARTICLES FROM HEAT EXTRACTION DEVICES

[75] Inventor: Vincent Howard Waldin, Wilmington, Del.

[73] Assignee: E. I. du Pont de Nemours and Company, Wilmington, Del.

[22] Filed: Aug. 12, 1971

[21] Appl. No.: 171,098

[52] U.S. Cl. .................................62/64, 62/266
[51] Int. Cl. ..................................F25d 17/02
[58] Field of Search..............62/62, 63, 64, 374, 62/375, 380, 266; 34/242; 99/197, 198

[56] References Cited

UNITED STATES PATENTS

| | | |
|---|---|---|
| 3,486,345 | 12/1969 | Waldin....................................62/63 |
| 2,019,551 | 11/1935 | Varney................................62/380 X |
| 3,635,045 | 1/1972 | Astrom..................................62/266 |

Primary Examiner—Meyer Perlin
Assistant Examiner—Ronald C. Capossela
Attorney—Francis J. Cromley

[57] ABSTRACT

In a process for extracting heat from articles by contacting them directly with an ebullient liquid polyfluorinated $C_1$-$C_4$ saturated halohydrocarbon freezant in a 100 percent freezant vapor zone, the method of removing the articles from said freezant-vapor zone by dropping them into a flowing stream of liquid which carries them to a discharge point outside the 100 percent freezant vapor zone; discharging the stream with the articles and separating the articles from the stream.

5 Claims, 2 Drawing Figures

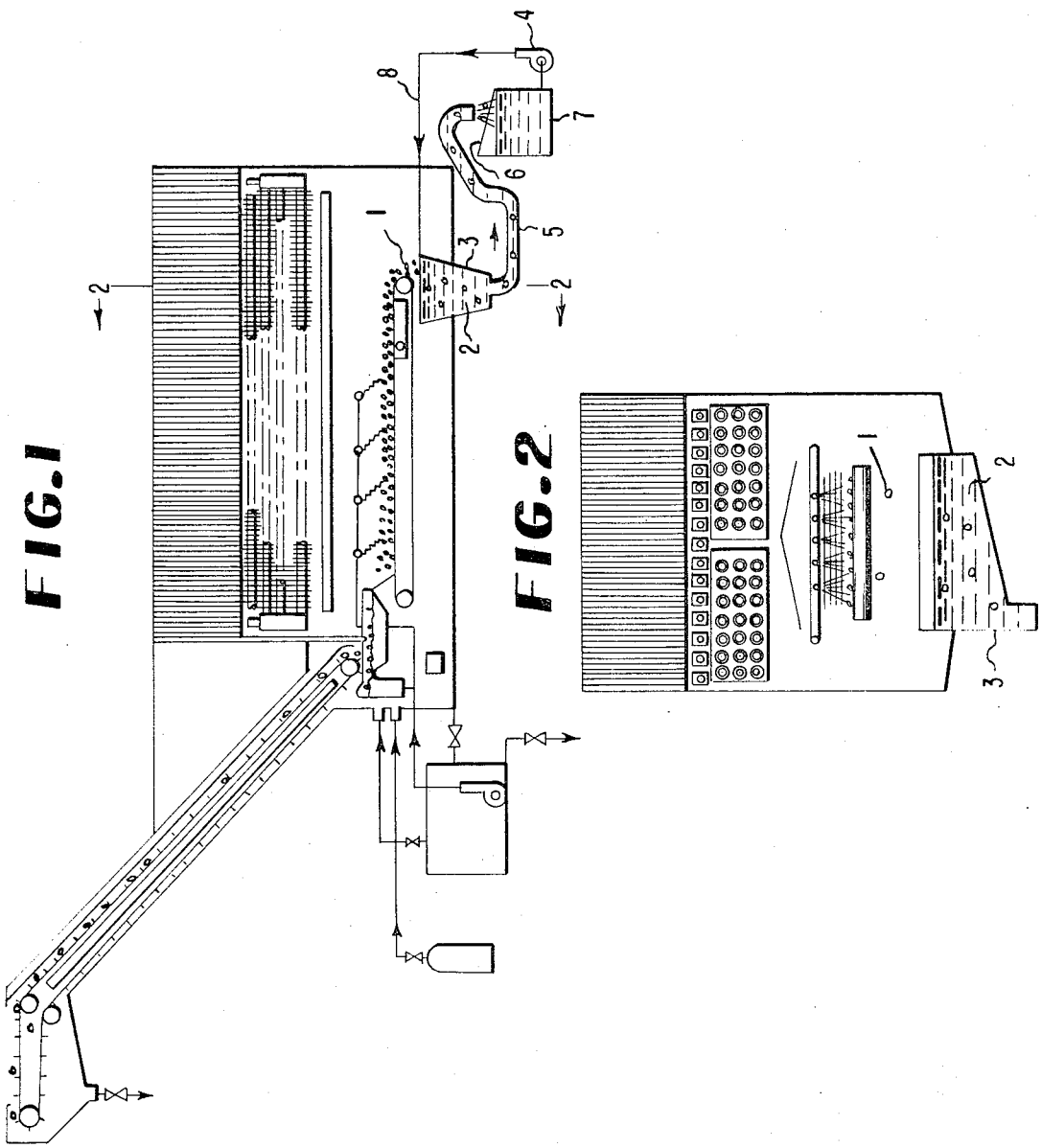

PROCESS FOR REMOVING ARTICLES FROM HEAT EXTRACTION DEVICES

BACKGROUND OF THE INVENTION

1. Field of the Invention

This invention relates to the extraction of heat from articles by directly contacting the articles with an ebullient polyfluorinated halohydrocarbon liquid freezant in the 100 percent freezant vapor zone of a heat extraction device and their removal from said freezant vapor zone.

2. Description of the Prior Art

A device and process for general heat extraction from articles using such freezants is disclosed by Waldin in U.S. Pat. No. 3,498,069. This patent discloses the maintenance of an interface between 100 percent freezant vapor and, above it, a non-condensible gas, normally air, in an open top vessel. The articles are brought into direct contact with the liquid freezant by passing them downwardly through the interface without introducing significant amounts of non-condensible gas, normally air, below the surface. Thus, because there is little mixing, the partial pressure of the freezant vapors in the freezing zone remained at about one atmosphere, thus facilitating their condensation on a condenser which established the position of the interface. In a similar manner the articles are removed from the 100 percent freezant vapor zone by passing them through the interface without substantial disturbance thereof. Foraminous conveyor belts are employed for the introduction and removal of articles.

A novel rapid and effective process for removing articles from the 100 percent freezant vapor zone of such a heat extracting device which also allows simultaneous treatment of the articles has now been discovered.

SUMMARY OF THE INVENTION

In a process for extracting heat from articles by contacting them directly with an ebullient liquid polyfluorinated $C_1$—$C_4$ saturated halohydrocarbon freezant in a 100 percent freezant vapor zone and removing them therefrom, the present invention is directed to an improved method for removing the articles from the 100 percent freezant vapor zone. In this invention the articles in said freezant vapor zone are dropped into a system containing a flowing stream of liquid. The articles flow along in the liquid stream to a discharge point outside the 100 percent freezant vapor zone where they are discharged in the stream and the articles are then separated from the liquid stream.

DESCRIPTION OF THE DRAWINGS

FIG. 1 is a plane view of a heat extraction device wherein articles may be frozen by direct contact with ebullient liquid polyfluorinated $C_1$—$C_4$ saturated halohydrocarbon freezant.

FIG. 2 is a cross-section of the heat extraction device of FIG. 1 taken through plane 2—2 of said FIG. 1.

DESCRIPTION OF THE INVENTION

The present invention involves a process for extracting frozen or cooled articles from the 100 percent freezant vapor zone of a heat extraction device by dropping the articles into a system containing a flowing stream of liquid; allowing the articles to flow along in this stream to a discharge point outside of the 100 percent freezant vapor zone from which they are discharged from the system and then separating the discharged articles from the liquid stream. This invention may be more clearly understood by referring to FIGS. 1 and 2. The unnumbered portion of FIG. 1 represents art-known aspects of a freezing or heat extracting device for liquid, solid or semi-solid articles which consists of an insulated chamber wherein the articles to be frozen are contacted with a liquid freezant. This chamber contains a condenser which is located above the zone where the articles to be frozen are contacted with the liquid freezant. The insulated chamber is equipped with an enclosed feed conveyor which inclines into the 100 percent freezant vapor zone which zone is also provided with a means for conveying articles to be frozen or cooled from the feed conveyor to an appropriate exit means.

The articles to be frozen are placed on the feed conveyor and are carried downward where they free fall onto a pan containing a flowing stream of ebullient liquid polyfluorinated $C_1$—$C_4$ saturated halohydrocarbon freezant (although the terms frozen and freezant are used herein, for convenience, it should be understood that both freezing and cooling 8 without freezing] are intended). The flowing stream of liquid freezant cascades over the lip of the pan carrying with it the articles which drop onto a moving conveyor belt which is traveling toward a series of liquid freezant sprays which drench the articles and complete the heat extraction.

In the process of this invention the frozen articles tumble from the end of the freeze conveyor into a flowing stream of liquid 2 contained in a system having a receiver 3. Alternatively, other means, e.g., a vibrating tilted screen, could be employed to permit drainage of freezant from the frozen articles and to introduce said articles into liquid 2. As stated above, this liquid stream 2 is flowing as indicated by the directional arrows. The flow in this particular FIGURE being caused by gravity flow from a hydraulic head in receiver 3 provided by pump 4. The flow of liquid stream 2 carries the articles 1 through conduit 5 outside of the 100 percent freezant vapor zone of the device. The articles are carried along in the flowing liquid stream through conduit 5 to a discharge point outside of said freezant vapor zone where the article-containing stream is discharged from conduit 5 and the frozen articles are then separated from the liquid stream. In the device of FIGS. 1 and 2, this separation is effected by use of a tilted vibrator screen 6 which allows the liquid stream 2 to pass therethrough into a reservoir 7 while the frozen articles 1, unable to pass through screen 6, fall from the tilted screen, for example, into packages for storage. Other separating means such as a moving foraminous belt or a tilted rotating cylindrical screen could be used in place of tilted screen 6 for separating frozen articles 1 from liquid stream 2. In the embodiment of FIGS. 1 and 2, the liquid stream of the system is returned via pipeline 8 to receiver 3 where a hydraulic head is created thus effecting continued liquid flow in the system. It should be noted that this hydraulic head in receiver 3 creates a liquid seal for the heat extraction device at this point.

Alternatively, a jet type pump can be employed to effect flow of liquid stream 2 wherein a nozzle, fed, for example, by a part of the stream of pipeline 8, is directed to a nozzle in conduit 5. Make-up liquid 2 may be added at any point. A part or all of the liquid 2 may be discarded intermittently or continuously to remove accumulated debris. As it is desireable to regulate the amount of heat transfer to the articles, as explained below, the temperature of the liquid 2 normally is regulated by any art-known means at any convenient point in the system.

Should liquid 2 tend to freeze on the walls of receiver 3 within the housing of the heat extraction device, the walls of receiver 3 can be insulated in that area and/or may be heated, for example, electrically by an art-known means.

The residence time of the frozen articles in the liquid 2 can be regulated between about 2 seconds to 10 seconds or more by variation of the velocity of the stream flow in receiver 3 and conduit 5, thus allowing removal of the articles from the 100 percent freezant vapor zone substantially faster than is possible by the art methods, e.g., by means of a conveyor belt.

The choice of operating parameters such as contact time depends on the treatment one wishes to effect on the articles. Heat transfer to the articles, for example, is an important compound variable which depends on several other variables which one should control. The amount of heat transferred to the articles will depend directly on the contact time. Another important variable affecting heat transfer is the temperature differential between the articles and the liquid of stream 2. It will thus normally be desirable to automatically regulate the temperature of the liquid 2. The temperature differential will also depend on the temperature of the articles leaving contact with the freezant in the 100 percent freezant vapor zone. As is known, the articles are not necessarily of even temperature throughout. Normally the outside is colder than is the inside; in a process for example wherein potato strips are surface frozen by immersion in liquid dichlorodifluoromethane followed by leaching in water to remove or redistribute liberated reducing sugars on the surface of the potatoes, this condition is deliberately sought by freezing only the outer surface of potato slices through limited brief contact with freezant. Thus the operator of the heat extraction device must take into account heat transfer not only from the liquid 2 but also from the inside of the article, his choice of parameters depending on the thermal condition in which he wishes the articles to leave the process.

Heat transfer also depends on other variables such as the nature of the liquid 2 and its turbulence. Aqueous liquids are more efficient in heat transfer than are non-aqueous liquids such as oils which are also operable in this invention. The particular liquid used is thus not critical but will be readily determined by one skilled in the art when the desired effect is determined. Examples of liquids which can be used are aqueous solutions and dispersions, oil-water emulsions, oils and for special purposes other liquids such as lower alkylene glycols. The more turbulent the liquid in the stream, the greater the heat transfer, of course. The equipment design can affect the degree of turbulence as for example in the use of a jet pump device in conduit 5 which introduces substantial turbulence.

It is one of the preferred embodiments of the invention to thaw, e.g., surface-frozen potato slices by utilizing water as liquid 2. In this embodiment a jet type pump is preferably employed in conduit 5. The temperature of the water is regulated at about 10°C. (50°F.) and the residence time of the slices therein is about 10 seconds. The thawed slices are preferably removed from the water by a tilted vibrating screen device. Some water is removed from the closed cycle in order to avoid excessive accumulation of debris and means are provided for addition of make-up liquid (water).

The above-described embodiment of the invention is preferably employed in conjunction with a device as described in FIG. 1. The preferred freezant for this process, dichlorodifluoromethane, does not form its hydrate in the liquid 2 as the temperature of the liquid is maintained well above the decomposition temperature of the hydrate. Water vapors escaping from receiver 3 can form freezant hydrate in other regions of the FIG. 1 device and means outside the instant invention may be employed to recover the freezant therein.

Another preferred embodiment of the invention provides a water glaze to frozen articles, for example, to particulate shrimp. In this modification the articles are more deeply frozen than the potato slices above by longer contact with dichlorodifluoromethane, are more briefly exposed to an aqueous liquid 2 maintained at a lower temperature. The bulk equilibrium temperature of the shrimp (the temperature to which the shrimp would equilibrate on adiabatic heat exchange between inside and outside) is brought to about 18°C. (0°F.) and thereafter the frozen shrimp are passed out of the freezing chamber by the process of this invention in a 1°–3°C. (34°–37°F.) aqueous liquid at a rate such that the residence time is about 2 seconds. The product leaving the vibrating screen 6 is thereby glazed and ready for storage.

Other useful treatments of cold or frozen articles can be effected utilizing various embodiments of the process of this invention by merely utilizing various liquids in the system. For example, other materials including oils or emulsions thereof with water can be added to foods or metal parts cooled for shrink fitting. Other coatings such as chocolate syrup can be coated on various foods such as ice cream blocks. Regulation of the parameters disclosed above along with attention to the heat capacities and surface to volume relations of the articles being coated as well as to the viscosities of the coating liquids, all of which is readily determinable by those having skill in the art, can provide a large variety of useful products.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. In a process for extracting heat from articles by contacting them directly with an ebullient liquid polyfluorinated $C_1$–$C_4$ saturated halohydrocarbon freezant in a 100 percent freezant vapor zone and removing them from said zone, the improvement which comprises:

a. removing the articles from the 100 percent freezant vapor zone by dropping said articles into a system containing a flowing stream of liquid;

b. flowing the articles along in said liquid stream to a discharge point outside of the 100 percent freezant vapor zone;

c. discharging the stream with the articles; and d. separating the articles from the liquid stream, the improvement characterized in that the residence time of the articles in the stream is regulated by varying the velocity of the stream flow.

2. A process according to claim 1 wherein the articles are separated from the liquid stream in (d) by passing the stream through a tilted screen which, while capable of allowing the stream to pass therethrough, prevents the articles from passing therethrough.

3. A process according to claim 1 wherein the flowing stream of liquid in the system is water.

4. A process according to claim 3 wherein the temperature of the water is about 10°C. and the residence time of the articles in the stream, prior to separation therefrom, is about 10 seconds.

5. A process according to claim 3 wherein the temperature of the water is about 1°–3°C. and the residence time of the articles in the stream, prior to separation therefrom, is about 2 seconds.

* * * * *